Patented June 3, 1924.

1,496,152

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

SEPARATION OF SOLUBLE SALTS.

No Drawing.    Application filed October 20, 1923.  Serial No. 669,749.

*To all whom it may concern:*

Be it known that I, CLINTON E. DOLBEAR, a citizen of the United States, residing at city and county of San Francisco and State of California, have invented certain new and useful Improvements in the Separation of Soluble Salts, of which the following is a specification.

My invention relates to the separation of soluble salts, one from the other, and it has particular, though not exclusive reference to the salts contained in brines.

My invention is based upon the discovery of differential behaviors of the various salts involved, at different temperatures, and under specific conditions, as will be hereinafter set forth.

Take a typical brine, such for example as the Searles Lake brine of California. This brine has a content as follows:—

|  | Per cent. |
|---|---|
| Potassium chloride | 4.75 |
| Borax (anhydrous) | 1.60 |
| Sodium carbonate | 4.70 |
| Sodium chloride | 16.50 |
| Sodium sulphate | 6.90 |
| Water | 65.65 |

In carrying out my process, I first eliminate, preferably by solar evaporation, the water of solution from the brine so that a practically dry mixture of salts is obtained.

A hot saturated solution of all of these salts will carry a certain fixed amount of each salt, while if the temperature be normal very much less potassium chloride and borax will be dissolved though the other salts remain either in the same amount or will dissolve in still greater amount.

Consequently, if a cold saturated solution of all of these salts is heated, say to boiling temperature, together with a certain amount of the dehydrated brine salts obtained initially, as above stated, from the natural brine, no further amount of sodium chloride, sodium carbonate or sodium sulphate will dissolve; but if the amount of solution is properly proportioned to the anhydrous salts used, all of the potassium chloride and borax dissolve.

If then the hot solution be separated from the undissolved portion of the salts and the solution allowed to cool to the same temperature at which it was before heating with the dehydrated salts, all of the potassium chloride and borax that was leached out of the dehydrated brine salts will crystallize from the solution and the solution will assume the same composition as it was before it was heated, and all of the potassium chloride and borax will have been recovered from the dehydrated brine salts leached.

These two salts may be separated in several ways. For example, I have found that if the hot solution as above be allowed to naturally cool in quiet condition, quite pure potassium chloride crystallizes out therefrom; and that if then the solution be carefully separated from the crystallized potassium salt, and then agitated, immediately borax is precipitated therefrom, thus providing a quite efficient means of separation of the borax from the potassium salt. Or the separation may be effected as follows:—

If the mixture of potassium chloride and borax obtained from the above procedure be mixed with a small amount of water, or with a saturated solution of potassium chloride, and the mixture be heated, the borax immediately goes into solution, while the potassium chloride in small amount, or in case saturated potassium chloride solution is used, none, goes into solution with the borax. This mixture of potassium chloride crystals and borax solution is then separated in a centrifugal machine as more fully described in my U. S. Letters Patent #1,382,825 of June 28, 1921. The hot borax solution from the centrifugal machine is allowed to crystallize and may be purified by recrystallization or by washing with cold water in the usual manner.

The mother liquor from these borax and potassium chloride crystallizations are mixed with more dehydrated brine salts, and heated, and more potassium chloride and borax dissolved therefrom. This is separated from the undissolved salts as before, and the brine cooled, the potassium chloride and borax crystallized therefrom, separated from the mother liquor and the latter again used to dissolve more potassium chloride and borax and the procedure repeated again and again indefinitely.

Thus a means is provided to recover the potassium chloride and borax from the other salts and to separate the potassium chloride and borax from each other.

In order to separate the mixed salts undissolved in the first operation, I next dissolve them in water, preferably in the right amount to quite completely dissolve them with as little excess of water as possible. This gives a dense solution of sodium chloride, sulphate and carbonate. I prefer to dissolve the salts at normal temperature. I then pass carbon dioxide into this solution, until the sodium carbonate is converted into sodium bicarbonate, which is nearly insoluble in the remaining sodium chloride and sulphate solution and consequently is precipitated out therefrom.

This precipitate is separated from the mother liquor, and washed free from impurities with water and the wash water mixed with water to be used to dissolve more of the sodium chloride, sodium sulphate and sodium carbonate as above described.

The purified bicarbonate of soda is either sold as such, or is heated whereby the bicarbonate is reduced to normal sodium carbonate, soda ash of commerce. In the latter case the expelled carbon dioxide can be used to carbonate more of the brine as above described.

The brine from the bicarbonate precipitate is next treated with ammonia until most or all of the sodium sulphate is precipitated therefrom. This is separated from the ammoniacal sodium chloride solution and freed from ammonia by washing or heating or both. If washed the wash water is used along with the wash water from washing of the sodium bicarbonate to dissolve more of the sodium chloride, sulphate and carbonate as above described.

The ammoniacal sodium chloride solution is heated in an ammonia still and the ammonia used to precipitate the sodium sulphate from more solutions after carbonating as above described. The sodium chloride brine exhausted of ammonia is next evaporated by appropriate means and the sodium chloride recovered therefrom. The mother liquor from this sodium chloride recovery contains small amounts of potassium chloride, sodium carbonate, borax and sodium sulphate beside being saturated with sodium chloride and is used to replace losses of water and solution in the original liquor used to leach out the potassium chloride and borax from the dehydrated brine salts.

I have found that this process is very efficient indeed, the recoveries being very complete when care is exercised in the handling of the solution in the various steps and that the recoveries and purity of the products are much higher, when the process is carried out on a larger scale, than in laboratory practice.

I claim:—

1. The process of separating soluble salts from each other wherein at least one of the salts does not, with increased temperature, materially increase in solubility in a mixed solution of the salts involved and wherein at least one of the salts does increase in solubility with increased temperature, said process comprising mixing the salts with a relatively cold saturated solution of all the salts involved; heating the mixture; separating the hot solution from the undissolved salts; cooling the hot solution in substantially quiescent condition; separating the precipitated salts from the cooled solution; and using the cooled solution as the saturated solution for the initial mixture therewith of the mixed salts, to repeat the cycle.

2. The process of separating mixed salts composed of chlorides, borates, carbonates and sulphates of potassium and sodium comprising leaching the mixed salts with a hot solution saturated with respect to the chloride, sulphate and carbonate of sodium, but unsaturated with respect to potassium chloride and borax; separating the hot solution from the leached salts; cooling the hot solution; separating the precipitated salts from the mother liquor; and using the mother liquor to dissolve the potassium chloride and borax from more of the mixed salts, to repeat the cycle.

3. The process of separating soluble salts from each other wherein at least one of the salts does not, with increased temperature, materially increase in solubility in a mixed solution of the salts involved, and wherein at least one of the salts does increase in solubility with increased temperature, said process comprising mixing the salts with a relatively cold saturated solution of all the salts involved; heating the mixture; separating the hot solution from the undissolved salts; cooling the hot solution; separating the precipitated salt therefrom; initiating crystallization of another salt from the separated solution; separating the precipitated salt from the solution; and using this final solution as the saturated solution for the initial mixture therewith of the mixed salts, to repeat the cycle.

4. In the process of separating soluble salts from each other, those steps for separating potassium chloride and borax and other sodium salts, comprising leaching the mixed salts with a hot solution saturated with respect to the other salts, but unsaturated with potassium chloride and borax; separating the leached salts from the hot solution; cooling the hot solution; separating the potassium chloride from the cooled solution; initiating borax crystallization in the cooled solution; separating the precipitated borax from this solution; and using this last solution as the saturated solution for the initial mixture therewith of the mixed salts, to repeat the cycle.

5. In the process of separating soluble salts, those steps for separating potassium chloride and borax and other sodium salts, comprising leaching the mixed salts with a hot solution saturated with respect to the other salts but unsaturated with potassium chloride and borax; separating the leached salts from the hot solution; cooling the hot solution in substantially quiescent condition; separating the precipitated potassium chloride from the cooled solution; initiating borax crystallization in the separated solution; separating the precipitated borax therefrom; and using the final solution to dissolve the potassium chloride and borax from more of the mixed salts, to repeat the cycle.

6. The process of separating mixed salts composed of chlorides, borates, carbonates, and sulphates of potassium and sodium, comprising leaching the mixed salts with a hot solution saturated with respect to the chloride, sulphate and carbonate of sodium but unsaturated with respect to potassium chloride and borax; separating the hot solution from the undissolved salts; cooling the solution in a substantially quiescent condition; separating the precipitated potassium chloride therefrom, initiating crystallization of borax therein; separating the precipitated borax from the solution; and using the final solution to dissolve the potassium chloride and borax from more of the mixed salts, to repeat the cycle.

In testimony whereof I have signed my name to this specification.

CLINTON E. DOLBEAR.